Oct. 11, 1932.  E. W. JOHNSON  1,882,636
DOUBLE ROW POTATO DIGGER
Filed Sept. 10, 1931   3 Sheets-Sheet 1

INVENTOR
E. W. Johnson
BY
ATTORNEY

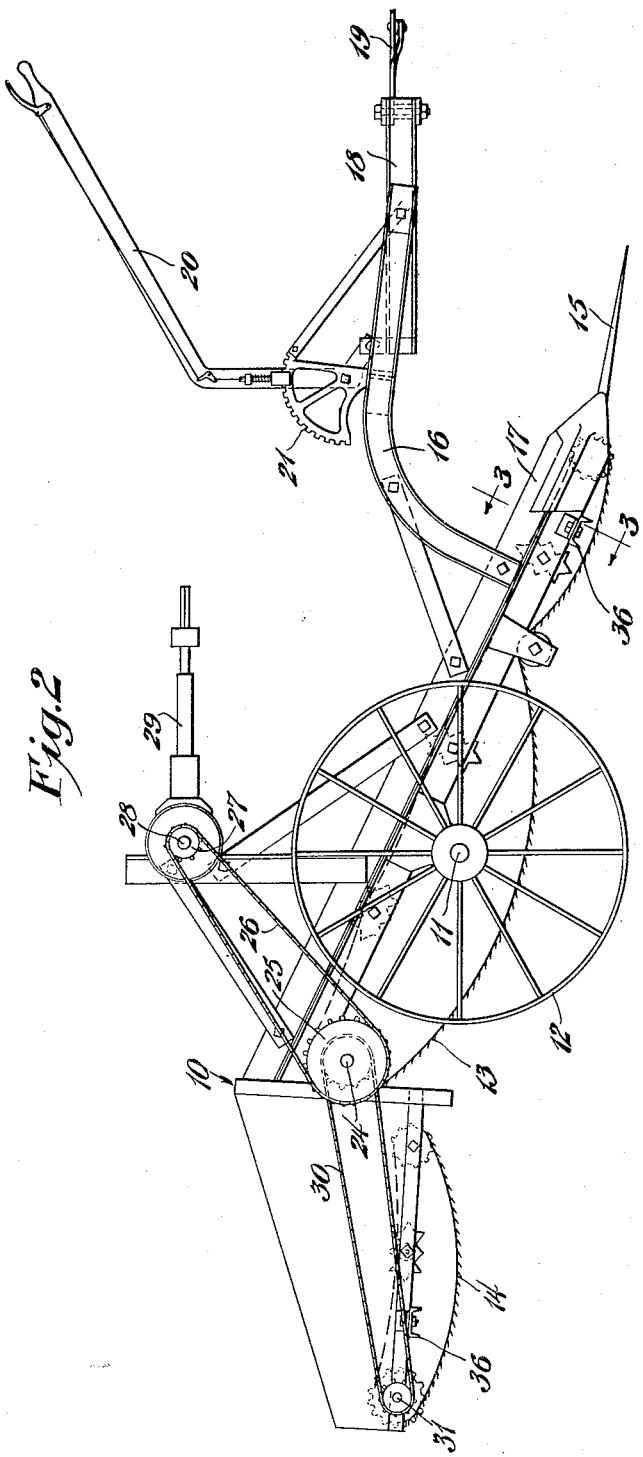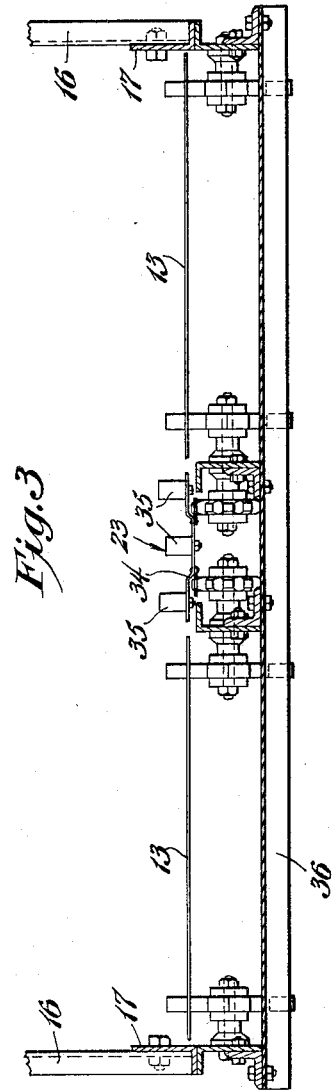

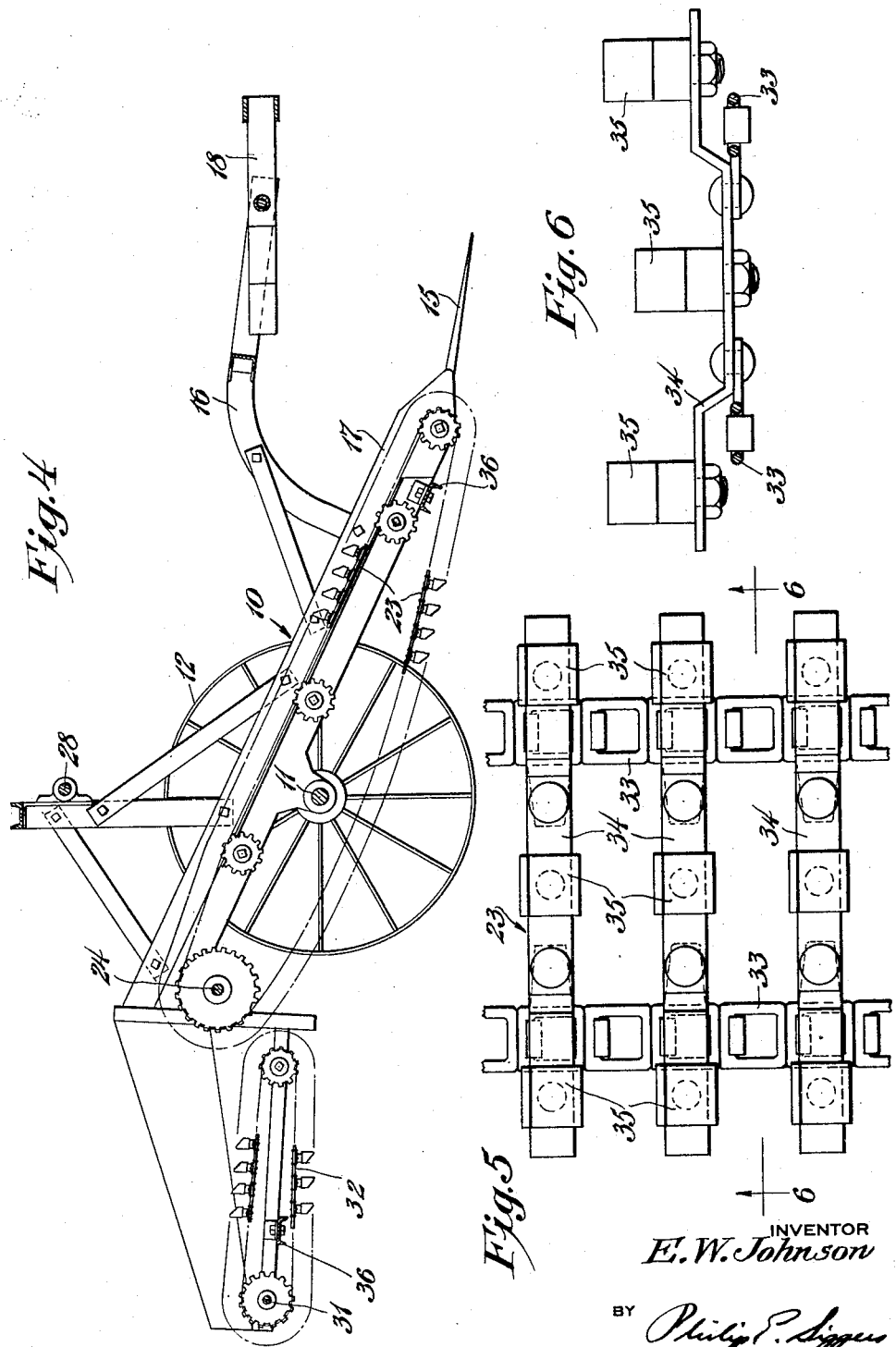

Patented Oct. 11, 1932

1,882,636

UNITED STATES PATENT OFFICE

ELMO W. JOHNSON, OF HICKSVILLE, NEW YORK

DOUBLE-ROW POTATO DIGGER

Application filed September 10, 1931. Serial No. 562,163.

This invention relates to double-row potato digging machines of the type adapted to be hitched to farm tractors and aims, among other objects, to provide an intermediate elevating chain or conveyor between a pair of digger units arranged to prevent the machine from being choked up or clogged by trash, vines and débris between the rows. Also, the invention provides improved driving mechanism on opposite sides of the machine for all of the conveyors so arranged that it will not interfere with the intermediate conveyor element and will not be clogged up by the débris.

Other aims and advantages of the invention will appear in the specification, when taken in connection with the accompanying drawings, wherein:—

Fig. 2 is a side elevation of the machine;

Fig. 3 is a sectional view taken on the line 3—3 in Fig. 2;

Fig. 4 is a sectional view taken on the line 4—4 in Fig. 1;

Fig. 5 is a fragmentary plan view of an intermediate elevating chain or conveyor made on an enlarged scale; and Fig. 6 is a sectional view taken on the line 6—6 in Fig. 5.

Figure 1:
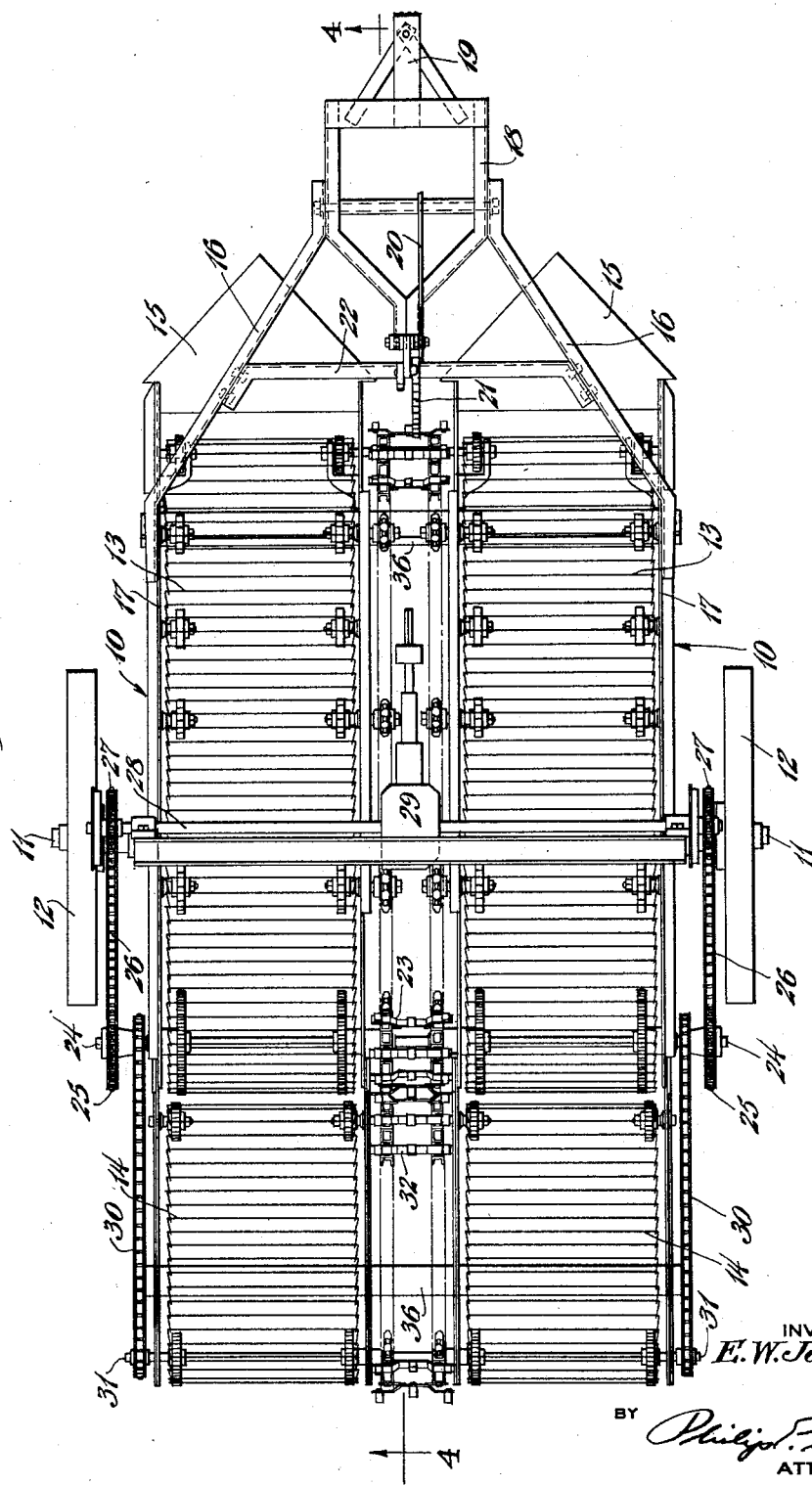
Fig. 1 is a top plan view of a machine embodying the invention.

It has been found in practice that double-row diggers of the type shown in my Patent No. 1,721,122, dated July 16, 1929, sometimes become clogged or choked up with vines, weeds, trash, etc. between the potato rows. Also, some of the potatoes are thrown between the shares and are covered by the trash and not harvested. This invention provides, among other improvements, a middle or intermediate conveyor to carry all of the débris and potatoes between the main conveyors effectively to prevent any clogging of the machine and to prevent loss of the potatoes.

Referring particularly to the drawings, the machine there shown includes a pair of digger units 10 mounted on an axle 11 having wheels 12 at the opposite ends. Each of the units is provided with the usual elevating conveyor 13 and a rear discharging conveyor 14. The forward ends of the units have shares 15 arranged to penetrate two hills. Instead of employing independent beams and yokes for the individual units, a single pair of beams 16 is shown as being connected to the outer frame elements 17 of the units and to these beams is pivotally connected a yoke 18 carrying an ordinary draw bar 19 adapted to be connected to a tractor (not shown). The rear end of the yoke 18 is connected to be raised and lowered by means of a lever 20 having a locking segment 21 on the transverse brace 22. The arrangement is such that both of the units may be raised and lowered so as to control the depth of penetration of the shares in much the same manner as disclosed in my aforesaid patent.

The digger units usually have longitudinal frame elements 17 providing flanges at both sides to prevent the potatoes from spilling over the sides of the conveyors. In this example, the flanged members at the inside are omitted and a middle or intermediate conveyor 23 is arranged between the inside frames of the units. This conveyor is substantially in the same plane as the elevating conveyors 13 and is adapted to be driven by the same shaft 24 which has sprockets for driving all of the conveyors. In this instance, the shaft 24 extends through the side frames of both units and has sprockets 25 on its outer ends driven by sprocket chains 26 trained over sprockets 27 on a driving shaft 28 which is directly driven by the power take-off shaft 29 adapted to be connected to the tractor. By this arrangement, the driving chains are out of the path of the débris or trash on the conveyors and cannot be choked up. Furthermore, driving chains 30 for the rear conveyors 14 are arranged on opposite sides of the units. The sprockets for driving the rear conveyors 14 are also arranged on a transverse shaft 31 extending across the two units and connected to drive a rear intermediate conveyor chain 32.

While several types of endless conveyors may be employed between the digger units, they are here shown as being made of chains 33 carrying transverse bars 34 on which are mounted a plurality of upstanding fingers 35

(Figs. 1, 4, 5 and 6). The chains are adapted to be driven by ordinary sprockets on the transverse shafts and the bars are connected to the links in the usual manner. The upstanding fingers are conveniently bolted or otherwise removably secured to the bars, as illustrated in Fig. 6. In this instance, the fingers at the opposite ends are elevated higher than the intermediate row of fingers because the bars are offset or bent to provide clearance for the driving sprockets. However, all of the fingers may be arranged at the same height and there may be as many fingers as desired. The outer rows of prongs or fingers 35 on the intermediate trash conveyor will act as barriers and thus provide side guards to retain the potatoes on the digger conveyors.

In order for the intermediate chain and its driving mechanism to function properly, it is necessary to brace the two digger units and prevent any relative movement. To this end, transverse braces or beams 36 are secured to the lower sides of the frames at the front and rear of the main conveyor sections. Thus, both units are rigidly connected and the three elevating conveyors at the front may be driven by the same shaft.

From the foregoing description, it will be seen that the machine is well adapted to dig potatoes in fields where a relatively large amount of débris has accumulated between the rows. Furthermore, all of the potatoes and vines or débris accompanying them are conveyed by the elevators to the rear of the machine so that none of the conveyors can become clogged or choked up. The intermediate conveyors can be installed in existing double-row machines by the simple expedient of removing the inside upstanding frame members or flanges, applying the necessary braces and connecting the driving mechanism substantially as described.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. A double-row potato digger comprising a pair of spaced digger units each having an elevating conveyor; and a single intermediate elevating conveyor between the units arranged to prevent débris from clogging the machine, and driven synchronously therewith.

2. A double-row potato digger comprising a pair of spaced digger units each having an elevating conveyor; braces rigidly connecting the units; a single intermediate chain conveyor between the units having means to engage brush forced up between the digger units; and power delivering means for driving all the conveyors.

3. A double-row potato digger comprising a pair of spaced digger units each having an elevating conveyor; transverse braces rigidly connecting units; a single intermediate débris conveyor between the units; transverse driving shafts extending across the units and connected to all of the conveyors; and power take-off driving connections for the shafts at the outsides of the units.

4. A double-row potato digger comprising a pair of spaced digger units each having an elevating conveyor; a single intermediate débris conveyor intermediate the units and extending the full length thereof; said intermediate conveyor having a series of fingers for engaging trash and débris.

5. A double-row potato digger comprising a pair of spaced digger units each having an elevating conveyor; braces rigidly connecting the units, an intermediate chain conveyor between the units; means on the chain conveyor providing side guards for the digger conveyors; a pair of beams connected to the outside of the units; a single yoke pivotally connected to the beams; a draw bar carried by the yoke adapted to be hitched to a tractor; and power delivering mechanism for deriving power from the tractor connected to drive all of said conveyors.

6. A double-row potato digging machine comprising, in combination, a pair of spaced digger units each having an elevating conveyor; means rigidly connecting the units; and an intermediate débris conveyor between the units extending from a point close to the ground between the diggers to an elevated point at the rear of the machine; said intermediate conveyor comprising side chains with heavy cross bars and upstanding fingers secured to the cross bars suitable for engaging vines and débris.

7. In a double-row potato digging machine, a pair of spaced digger units each having an elevating conveyor; an intermediate trash conveyor between said units; means on said trash conveyor to engage trash forced upwardly between the digger units; and means on the trash conveyor providing side guards to retain the potatoes on the digger conveyors.

In testimony that I claim the foregoing as my own, I have hereto affixed my signature.

ELMO W. JOHNSON.